(12) United States Patent
Hiramatsu et al.

(10) Patent No.: US 6,588,765 B2
(45) Date of Patent: Jul. 8, 2003

(54) MONOLAYER METAL GASKETS

(75) Inventors: Tsuyoshi Hiramatsu, Osaka (JP); Kiyoshi Sugimoto, Osaka (JP); Kazuya Yoshijima, Aichi-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/817,115

(22) Filed: Mar. 27, 2001

(65) Prior Publication Data

US 2001/0026045 A1 Oct. 4, 2001

(30) Foreign Application Priority Data

Mar. 29, 2000 (JP) .................................. 2000-092021

(51) Int. Cl.[7] .............................................. F02F 11/00
(52) U.S. Cl. ........................ 277/591; 277/592; 277/593
(58) Field of Search ................................ 277/590, 591, 277/592, 593, 594, 595, 596, 597, 598, FOR 248

(56) References Cited

U.S. PATENT DOCUMENTS

| | | | | |
|---|---|---|---|---|
| 5,209,504 A | * | 5/1993 | Udagawa et al. | 277/595 |
| 5,213,345 A | * | 5/1993 | Udagawa | 277/595 |
| 5,364,109 A | * | 11/1994 | Sihon | 277/592 |
| 5,588,657 A | * | 12/1996 | Fujisawa et al. | 277/593 |
| 5,876,038 A | * | 3/1999 | Bohm et al. | 277/593 |
| 5,951,021 A | * | 9/1999 | Ueta | 277/593 |
| 6,126,172 A | * | 10/2000 | Okano | 277/593 |
| 6,186,506 B1 | * | 2/2001 | Kionoshita | 277/313 |
| 6,206,381 B1 | * | 3/2001 | Ii et al. | 277/593 |
| 6,283,480 B1 | * | 9/2001 | Miura et al. | 277/593 |
| 6,315,303 B1 | * | 11/2001 | Erb et al. | 277/593 |
| 6,336,639 B1 | * | 1/2002 | Ishida et al. | 277/594 |

FOREIGN PATENT DOCUMENTS

| | | |
|---|---|---|
| JP | 139057/1981 | 10/1981 |
| JP | 278375/1987 | 12/1987 |
| JP | 01215957 | * 8/1989 |
| JP | 200506/1996 | 8/1996 |
| JP | 63228/1999 | 3/1999 |

* cited by examiner

Primary Examiner—Anthony Knight
Assistant Examiner—Vishal Patel
(74) Attorney, Agent, or Firm—Browdy and Neimark, P.L.L.C.

(57) ABSTRACT

A monolayer metal gasket is disclosed, which may be kept against deformation around a bolt hole and further made stable in sealing stress around a gas hole between mating surfaces of confronting components. A first extra thickness around the gas hole is provided by turning back a part of a metallic sheet on a major flat of the metallic sheet, with leaving a space open between them to form a folded construction having elasticity. A second extra thickness around a bolt hole is a closely layered construction of nearly rigid body little to be deformed. When the monolayer metal gasket is squeezed between the mating surfaces of the confronting components, a clearance between the mating surfaces may be regulated to a preselected distance by virtue of the second extra thickness that is little to be deformed.

5 Claims, 5 Drawing Sheets

MONOLAYER METAL GASKETS

BACKGROUND OF THE INVENTION

1. Field of the Invention

The present invention relates to a monolayer metal gasket in which a monolayer metallic sheet is provided therein with gas holes and bolt holes allowing fastening bolts to fit in there, while extra thickness areas are arranged around the gas holes and the bolt holes to seal certainly a joint between confronting surfaces of, for example engine components.

2. Description of the Prior Art

A monolayer metal gasket of the type disclosed in Japanese Utility Model Laid-Open No. 139057/1981 is conventionally known to those skilled in the art. The monolayer metal gasket is composed of a metallic sheet of steel, copper, aluminum, and so on, which is turned over at the perimetral edges of the holes such as gas holes, coolant holes and others in the metallic sheet to thereby form cushions of arc in cross section.

Another prior monolayer metal gasket is disclosed Japanese Patent Laid-Open No. 200506/1996, in which there are provided folded constructions surrounding the gas holes and the bolt holes for sealing function, and beads of rubber-like substance arranged around the gas holes and the bolt holes for excessive compression-stopper function.

In most conventional multi-layered metal gaskets, the sheet with the folded construction serves for an intermediate plate regulating the thickness of the gasket. Because of rendering the metalworking of the folded construction much easier as well as the function of the intermediate plate, the sheet with the folded construction is of a thin sheet of about 0.1 to 0.2 mm in thickness. Thus, it becomes inevitable to overlay another sheet to support such thin sheet as stated earlier, for example, other additional intermediate plate on the primary intermediate plate. As a result, most multi-layered gaskets having at least three sheets introduce costly production requirements and become much complicated as a whole.

Moreover, in prior multi-layered metal gaskets installed between mating surfaces of, for example a cylinder head and a cylinder block of an engine, no special regard has been paid on the provision of any construction making it possible to suppress forcibly the warp or distortion that might occur in the mating surfaces at areas neighboring the bolt holes when the clamping force resulting from the tightening of the fastening bolts fitting in the bolt holes squeezes multi-layered metal gasket installed between the mating surfaces. Because of such condition as stated earlier, the multi-layered metal gaskets still undergo much deformation around the bolt holes and consequently the deformation occurring around the bolt holes in the multi-layered metal gasket affects negatively the areas around the gas holes to cause variations in clearance between the mating surfaces even around the gas holes. This makes it impossible to ensure the desired sealing stress with sufficient balance around the holes, which is enough to prevent leakage of pressure gases such as combustion gases from the joint around the gas holes.

A monolayer metal gasket in which only one metallic sheet is adapted between the confronting surfaces of the components to be jointed together is very simple in construction, compared with the multi-layered metal gasket stated earlier. Nevertheless, even such monolayer metal gasket made simplified in construction, the deformation or distortion occurring in the monolayer metal gasket around the bolt holes when the tightening of the fastening bolts clamps together the mating surfaces of the confronting components affects negatively the sealing stress acting on the mating surfaces around the gas holes. Thus, it will be worthwhile limiting an amount of distortion in the gasket to thereby make the sealing stress between the mating surfaces much more stable.

SUMMARY OF THE INVENTION

The present invention has as its primary object to provide a monolayer metal gasket comprising a single metallic sheet made therein with gas holes and bolt holes in which fastening bolts fit, wherein the metallic sheet is provided with extra thickness constructions around the gas holes and the bolt holes, one to each hole, the extra thickness constructions being made larger in thickness than a major area of the metallic sheet to ensure a desired sealing stress with sufficient balance around the gas holes where pressure gases such as combustion gases flow, thereby preventing leakage of pressure gases such as combustion gases through between the mating surfaces of the engine components.

The present invention is concerned with a monolayer metal gasket comprising a single metallic sheet made with a gas hole and a bolt hole through which a fastening bolt is adapted to pass, a first extra thickness formed around the gas hole and made larger in thickness than the metallic sheet, and a second extra thickness formed around the bolt hole and made larger in thickness than the metallic sheet, wherein the first extra thickness is provided by turning back a part of the metallic sheet on a major flat of the metallic sheet, with leaving a space open between them, while the second extra thickness is provided by folding back a part of the metallic sheet on the major flat of the metallic sheet to make a closely layered construction.

In accordance with one aspect of the present invention, a monolayer metal gasket is disclosed wherein the first extra thickness is composed of a first base part extending around the gas hole integrally from a major flat of the metallic sheet, and a first folded part integral with the first base part and turned back on the first base part, with leaving the space between them.

In accordance with another aspect of the present invention, a monolayer metal gasket is disclosed wherein the second extra thickness is composed of a second base part extending around the bolt hole integrally from a major flat of the metallic sheet, and a part overlaid on the second base part into the closely layered construction.

In accordance with another aspect of the present invention, a monolayer metal gasket is disclosed wherein the overlaid part is a second folded part extending integrally from the second base part and turned back around the bolt hole.

In accordance with another aspect of the present invention, a monolayer metal gasket is disclosed wherein the overlaid part is a part prepared independently of the metallic sheet and arranged around the bolt hole.

In accordance with a further another aspect of the present invention, a monolayer metal gasket wherein the overlaid part is a washer.

In accordance with another aspect of the present invention, a monolayer metal gasket is disclosed wherein the overlaid part is made of a lug protruding integrally out from the major flat of the metallic sheet and made therein with a cut hole, with leaving an annular part, the lug being turned back in such a way to align the cut hole with the bolt hole whereby the annular part surrounds the bolt hole.

In accordance with another aspect of the present invention, a monolayer metal gasket is disclosed wherein the second extra thickness has a thickness twice as much as the major flat of the metallic sheet.

In accordance with another aspect of the present invention, a monolayer metal gasket is disclosed wherein the major flat of the metallic sheet has a thickness ranging from 0.2 mm to 0.8 mm.

In accordance with a further aspect of the present invention, a monolayer metal gasket is disclosed wherein the metallic sheet is overlaid with a shim plate at an area between any adjacent gas holes.

The monolayer metal gasket constructed as stated earlier is made of a single metallic sheet having elasticity. In addition, the first extra thickness around the gas hole is formed in a folded construction in which a folded part is turned over the major flat of the metallic sheet not to form an closely overlaid construction but to leave the space between them to afford the resiliency at the first extra thickness.

In contrast, the overlaid part in the second extra thickness around the bolt hole comes in overall close engagement with the major flat of the metallic sheet to form a closely layered construction of nearly rigid body little to be deformed even when the monolayer metal gasket is squeezed.

With the monolayer metal gasket of the present invention, the first extra thickness has the elasticity by virtue of the space whereas the second extra thickness is formed in nearly rigid body little to be deformed.

When the clamping force that results from the tightening of the fastening bolt squeezes the monolayer metal gasket installed between the mating surfaces of the components to be sealed together, the second extra thickness of nearly rigid body is seldom subject to deformation, and therefore the amount of tightening, ranging from a first status where the axial force of the fastening bolt begins forcing the gasket to a second status where the tightening of the fastening bolt is made completed, may be controlled to a preselected desired amount of tightening. Thus, the clearance around the bolt hole between the mating surfaces may be regulated well to a preselected distance. The second extra thickness also serves for the sealing function around the bolt hole.

With the monolayer metal gasket of the present invention, the first extra thickness, when squeezed between the mating surfaces, serves for the seal around the gas hole by virtue of the elasticity in itself, while the second extra thickness serves to regulate the clearance between the mating surfaces of the components to a preselected distance. Even around the gas hole, the clearance between the mating surfaces is adjusted depending on the preselected distance regulated at the second extra thickness. This results in reducing the variation in sealing stress around the gas hole, thereby realizing the desired sealing stress with preferred balance.

As the second extra thickness regulates well the clearance between the mating surfaces to the desired distance, the clearance between the mating surfaces around the gas hole is also adjusted according to the preselected distance regulated at the second extra thickness whereby the sealing stress around the gas hole is reduced in variation to be made stabilized. This contributes to the sealing stress balanced well around the gas hole. Varying the relation in thickness between the first extra thickness and the second extra thickness may carry out control of the sealing stress around the gas hole.

Moreover, since the monolayer metal gasket of the present invention is principally made of a single metallic sheet having elasticity, the monolayer metal gasket may be made simple in construction and inexpensive in production cost.

BRIEF DESCRIPTION OF THE DRAWINGS

In FIG. 6(a) the gasket is shown in plan view; and in FIG. 6(b) the gasket is illustrated in cross section taken along the line V—V of FIG. 6(a):

In FIGS. 7(a) and 7(b) the gasket is shown in plan view; and in FIG. 7(c) the gasket is illustrated in cross section taken along the line VI—VI of FIG. 7(b)

DETAILED DESCRIPTION OF THE PREFERRED EMBODIMENTS

A monolayer metal gasket according to the present invention will be in detail explained below with reference to FIGS. 1 to 5 in accompanying drawings.

Figure 2:
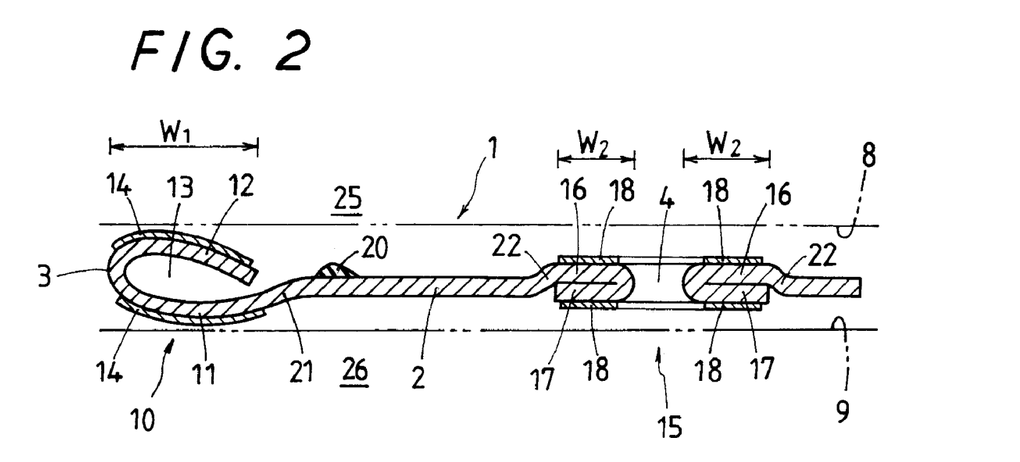
FIG. 2 is an enlarged sectional view of the monolayer metal gasket and is taken along the line I—I of FIG. 1.

A monolayer metal gasket 1 shown in FIG. 2 is a cylinder-head gasket adapted installed in place and squeezed between mating surfaces 8, 9 of confronting engine components; a cylinder head 25 and a cylinder block 26. In FIG. 2, the monolayer metal gasket 1 is shown disposed between the mating surfaces 8, 9 of the cylinder head 25 and the cylinder block 26 prior to tightening fastening bolts.

Figure 1:
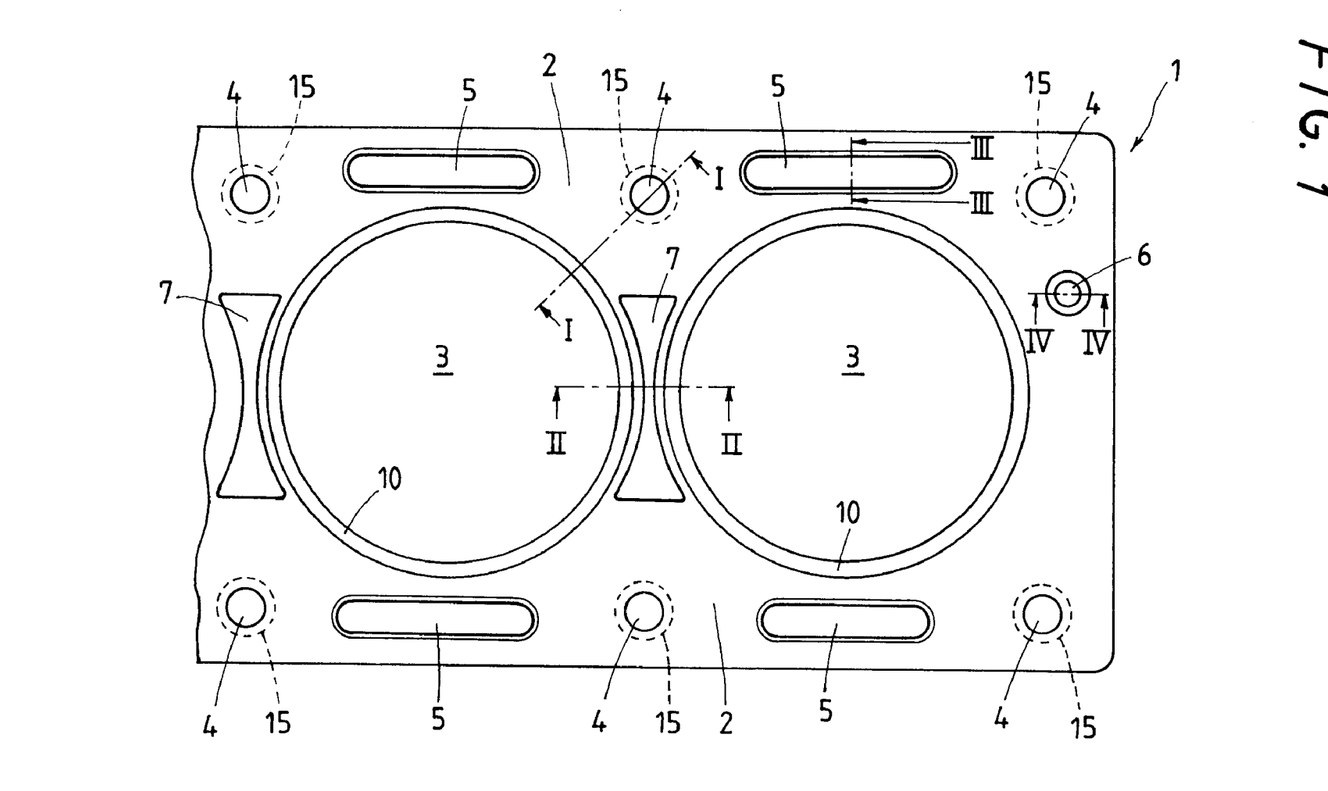
FIG. 1 is a top plan view showing a preferred embodiment of a monolayer metal gasket according to the present invention.

The monolayer metal gasket 1 is composed of a single elastic metallic sheet having a major flat 2 in which gas holes 3 are bored in alignment with cylinder bores of the engine. Further bored around the gas holes 3 are bolt holes 4 in which fastening bolts fit to squeeze the monolayer metal gasket 1 between the mating surfaces 8, 9 of the cylinder head 25 and the cylinder block 26, and also water holes 5 and oil holes 6 allowing coolant and oil to flow through there, respectively.

Areas between any two adjacent gas holes 3 are among areas that are most subject to combustion gas pressure for engine operation, which behave in a manner that parts the mating surfaces 8, 9 of the cylinder head 25 and the cylinder block 26 from one another. To continue keeping the sealing stress between the mating surfaces 8, 9 sufficient at any area between any two adjacent gas holes 3, the major flat 2 of the monolayer is overlaid with shim plates 7 to adjust the major flat 2 in thickness at the areas between the adjacent gas holes 3. The shim plates 7 attached on the major flat 2 may serve well to enhance the sealing performance at the areas between the adjacent gas holes 3, preventing leakage of high-temperature, high-pressure combustion gases. With the first illustrative embodiment, the monolayer metal gasket 1 is fabricated from an elastic metallic sheet of 15% Mn-1% to 2% Ni-0.5% N stainless steel having non-magnetic property. The metallic sheet of the monolayer metal gasket 1 has a thickness of 0.5 mm at the major flat 2.

Figure 3:
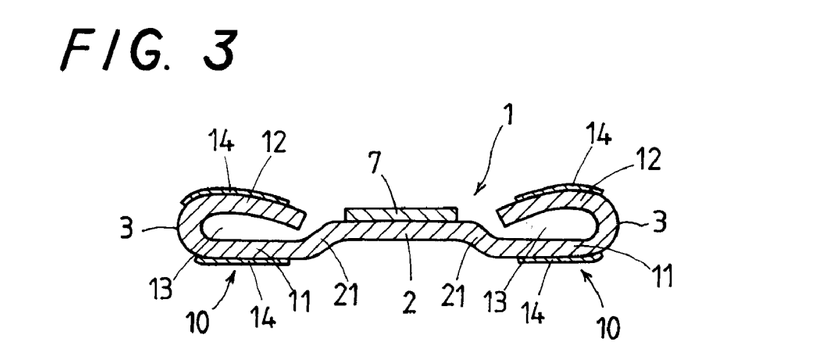
FIG. 3 is an enlarged sectional view of the monolayer metal gasket and is taken along the line II—II of FIG. 1.

As seen from FIGS. 2 and 3, an annular first extra thickness 10 made larger in thickness than the major flat 2 is arranged around the associated gas hole. The annular first extra thickness 10 is provided by a folded construction comprised of a first base part 11 extending integrally from the major flat 2, and a folded part 12 integral with the first base part 11 and also turned back over the first base part 11 around the associated gas hole 3, so that the first base part 11 starts from the major flat 2, reaching continuously the first folded part 12 through a smooth bent 21. The first folded part 12 of the monolayer metal gasket 1 is turned back on the first base part 11 to form a space between them. Thus, the first base part 11 and the first folded part 12, which is integral with the first base part 11 and turned back on the first base part 11, form in combination with one another the first extra thickness 10 raised thickness-wise of the major flat 2 above opposite sides of the major flat 2. The space 13 is unspecified in its shape unless the first folded part 12 comes in contact at the free end thereof with the first base part 11 whenever the gasket remains under no squeezed condition. The first extra thickness 10 is applied with coatings 14 for microsealing, which are arranged on outsides of the first base part 11 and the folded part 12 with opposing to each other and facing the associated one of the mating surfaces 8, 9.

Formed around the bolt hole 4, as shown in FIG. 2, is a second annular extra thickness 15 made somewhat increased in thickness compared with the major flat 2. In the second extra thickness 15, a second folded part is inherently kept in overall close engagement with a second base part so as to form a layered construction, whether the monolayer metal gasket 1 is squeezed or released from the tightening of the fastening bolts. According to the illustrative embodiment, the second extra thickness 15 is composed of a second base part 16 integral with the major flat 2 through an offset portion 22 raised smoothly above the major flat 2, and a second folded part 17 turned back on the second base part 16 to come in overall close engagement with the second base part 16 in the form of the layered construction. Furthermore, the second base part 16 and the second folded part 17 are raised in opposition to each other above their associated sides of the major flat 2 in such a way that their tops facing the associated mating surfaces 8, 9 are asymmetry to each other in height above the associated sides of the major flat 2. Turning back the second folded part 17 on the second base part 16 results in forming the bolt hole 4.

The second extra thickness 15 increases its thickness about twice as large as the major flat 2. Thus, the second extra thickness 15 is made thickened as large as 1.0 mm, and nearly rigid body little to be deformed. The second extra thickness 15 is also applied with coatings 18 for microsealing, which are arranged on outsides thereof facing the associated one of the mating surfaces 8, 9. With regarding the first extra thickness 10 around the gas hole 3 as the primary seal, a soft sealing member 20 of arbitrary height serving for the secondary seal is arranged on any one side of the major flat 2 by application or adhesion at an area neighboring the first extra thickness 10.

Figure 4:
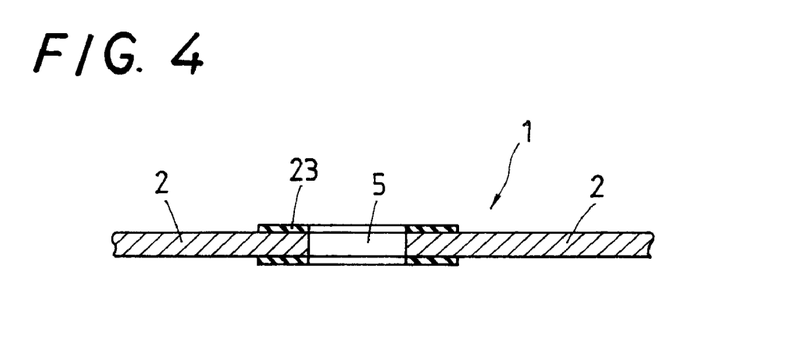
FIG. 4 is an enlarged sectional view of the monolayer metal gasket and is taken along the line III—III of FIG. 1.

Referring next to FIG. 4 showing a sealing construction around the coolant hole 5 in the monolayer metal gasket 1 in cross section taken along a line III—III of FIG. 1, a soft sealing member 23 of rubbers, and so on is secured around the coolant hole 5 by application or adhesion.

Figure 5:
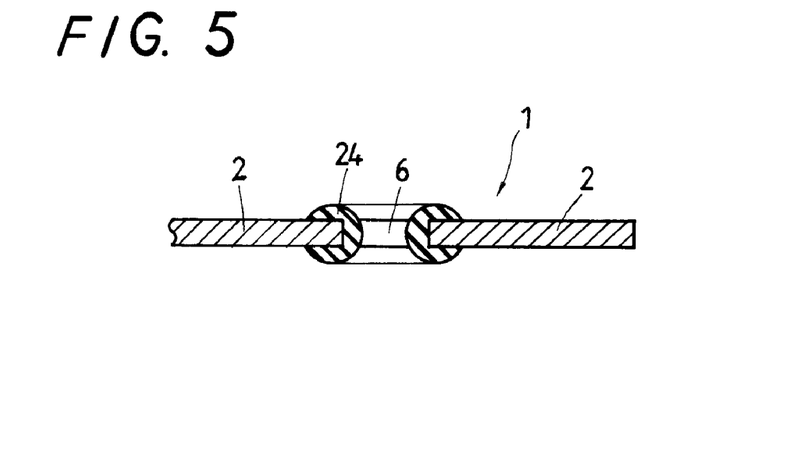
FIG. 5 is an enlarged sectional view of the monolayer metal gasket and is taken along the line IV—IV of FIG. 1.

FIG. 5 shows a sealing construction around the oil hole 6 in the monolayer metal gasket 1 in cross section taken along the line IV—IV of FIG. 1. An annular soft sealing member 24 of rubbers or others is arranged surrounding the oil hole 6. These soft sealing members 23, 24 serve preventing the coolant and/or oil flowing across the monolayer metallic gasket 1 from leakage between the confronting surfaces 8, 9 through around the coolant hole 5 and/or the oil hole 6.

With the monolayer metal gasket 1 constructed as stated earlier, the first extra thickness 10 may keep the spring effect by virtue of the existence of the space 13 continuously whenever the clamping force resulting from the tightening of the fastening bolt squeezes, whether partially or completely, the monolayer metal gasket 1 installed between the mating surfaces 8, 9 of the cylinder head 25 and the cylinder block 26. As a result, the first extra thickness 10 is urged resiliently into the close engagement with the mating surfaces 8, 9 to create highly compressive sealing stress around the gas hole 3.

In contrast, because the second extra thickness 15 is nearly rigid body that is little to be deformed, the amount of tightening when the fastening bolt squeezes with a preselected axial force the monolayer metal gasket 1 placed between the mating surfaces 8, 9 is limited to a specified amount of tightening, ranging from a first status where the second extra thickness 15 comes in contact with the mating surfaces 8, 9 to a second status where the tightening of the fastening bolt is made completed. Accordingly, the clearance between the confronting surfaces 8, 9 around the bolt hole 4 is controlled evenly to a preselected distance for all the bolt holes 4. As many bolt holes 4 are arranged along the periphery of the monolayer metal gasket 1, controlling evenly the distance between the confronting surfaces 8, 9 for all areas neighboring the bolt holes 4 results in keeping the sealing stress for all areas around the gas holes 3 at a desired amount of stress, and also making the balance of the desired amount of stress stabilize to a preselected value. Moreover, the variation in thickness of the first extra thickness 10 and the second extra thickness 15 makes it easy to regulate the compressive sealing stress around the associated gas hole 3, and also to adjust well the balance with the sealing stress around the coolant holes 5, and so on. In addition, high compressive sealing stress around the bolt hole 4 may ensure the reliable sealing around the bolt hole 4.

Although not shown, a radial width $W_1$ of the first extra thickness 10 may be varied circumferentially about the gas hole 3. The sealing stress needed at the area between any two adjacent gas holes 3 should be higher than that needed at the residual area. To cope with this, it is preferred to make the first extra thickness 10 large in radial width $W_1$ at the area between the adjacent gas holes 3. On the other hand, a radial width $W_2$ of the second extra thickness 15 may be locally enlarged in a specific direction that experiences large distortion.

Figure 6:
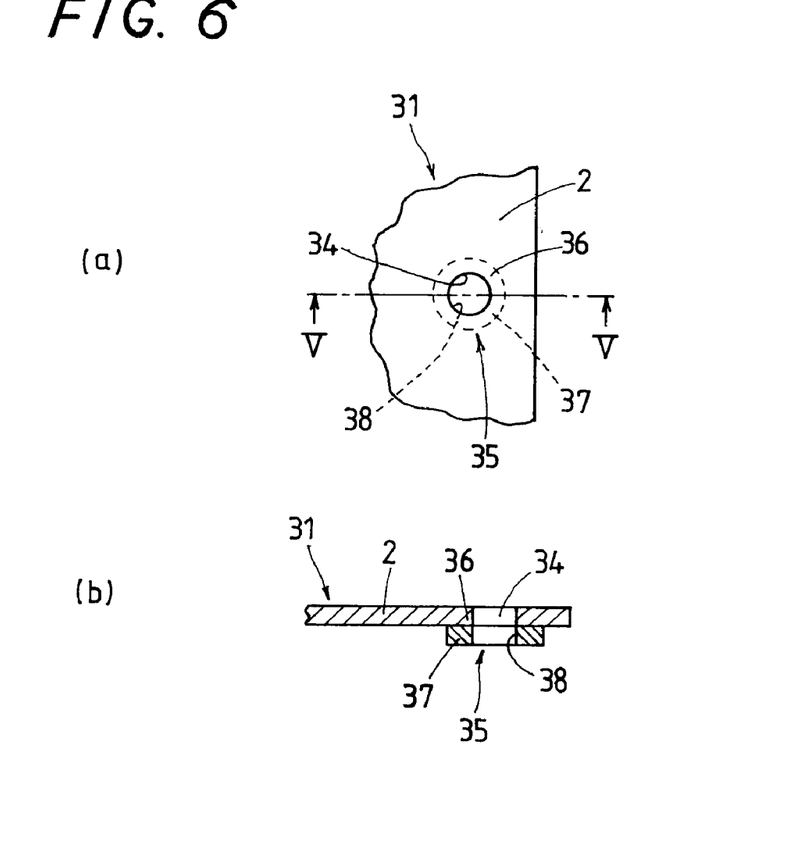
FIG. 6 illustrates another embodiment of a monolayer metal gasket according to the present invention at an area neighboring a bolt hole.

Another embodiment of the monolayer metal gasket according to the present invention will be understood by reference to the following description taken in connection with FIG. 6.

A monolayer metal gasket 31 has a second extra thickness 35 around a bolt hole 34, in which the major flat 2 is overlaid with a washer 37 at a second base part 36 around the bolt hole 34 to form a closely layered construction. The washer 37 is secured on any one side of the second base part 36 by welding, fusion, and so on at specific area around the bolt hole 34. A hole 38 bored in the washer 37 comes in alignment with the bolt hole 34 to allow the fastening bolt to extend through there. The second extra thickness 35 has a thickness twice as much as the major flat 2, and serves the same functions as the second extra thickness 15 in the first embodiment stated earlier.

A further modification of the monolayer metal gasket according to the present invention will be explained with reference to FIG. 7.

A monolayer metal gasket 41 has a lug 47 integral with the major flat 2 and protruding out from the major flat 2. The lug 47 is made therein with a cut hole 48, which is produced so as to be brought into alignment with the associated bolt hole 44 when the lug 47 is folded back over the major flat 47 as stated later. A second extra thickness 45 around the bolt hole 44 is composed of a second base part 46 and an annular part 49 folded back over the second base part 46 to form a closely layered construction. The alignment of the cut hole 48 with the bolt holes 44 allows the fastening bolt to extend through there. The second extra thickness 45 has a thickness twice as much as the major flat 2, and serves the same functions as the second extra thickness 15 in the first embodiment stated earlier.

Figure 8:
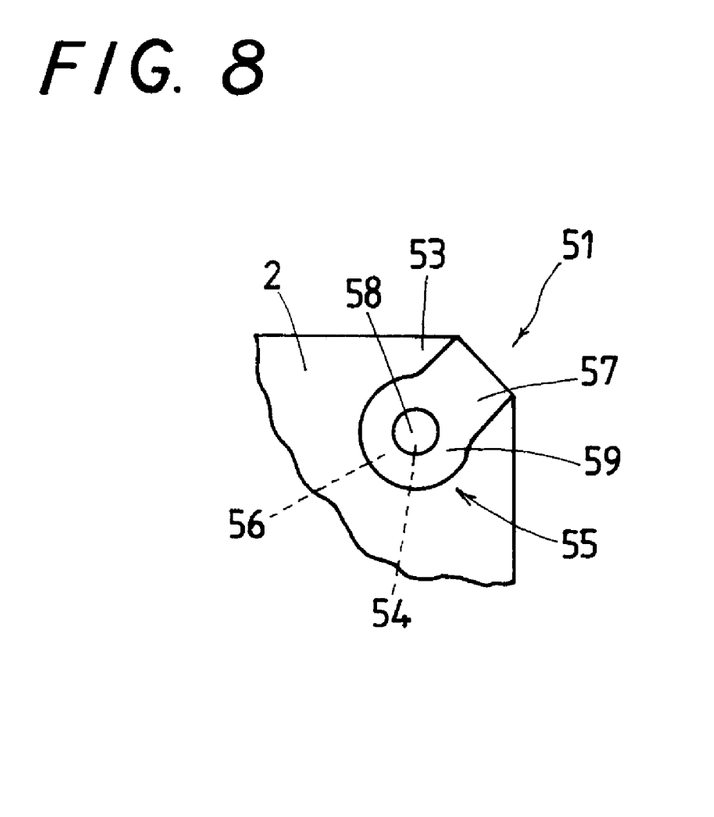
FIG. 8 is a fragmentary plan view showing a fourth embodiment of a monolayer metal gasket according to the present invention at an area around a bolt hole.

Another alternation of the monolayer metal gasket according to the present invention will be explained with reference to FIG. 8.

Figure 7:
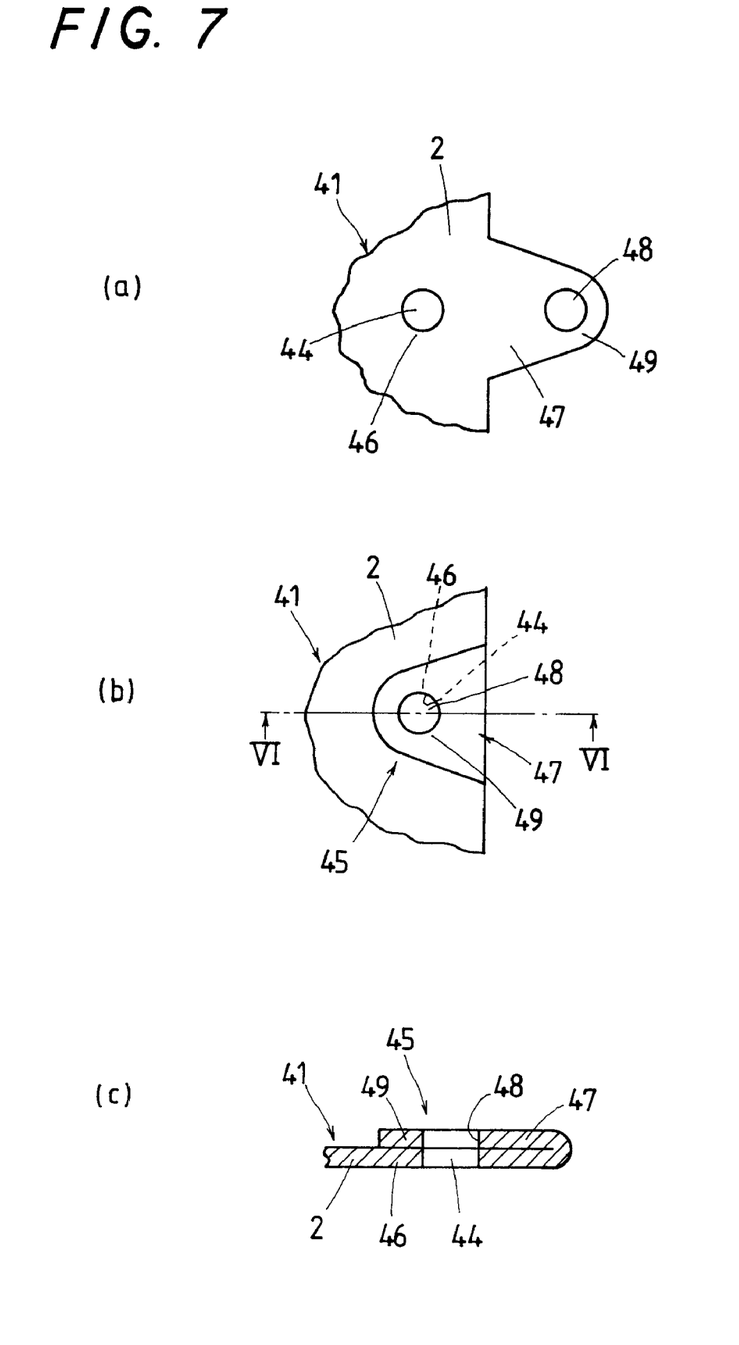
FIG. 7 illustrates a further another embodiment of a monolayer metal gasket according to the present invention at an area neighboring a bolt hole.

An illustrative example of a monolayer metal gasket 51 is equivalent in construction to FIG. 7(*b*), but the bolt hole is made at a corner 53 of the major flat 2. In this monolayer metal gasket 51, a lug 57 extending integrally form the major flat 2 is folded back on the corner 53 in a direction bisecting an angle of the corner 53 to form a second extra thickness 55 of closely layered construction. When the lug 57 is overlaid closely on the corner 53 of the major flat 2, a cut hole 58 in the lug 57 is kept in alignment with a bolt hole 54 in the corner 53 to provide a passage for the fastening bolt. Thus, it will be understood that the second extra thickness 55 is comprised of a second base part 56 around the bolt hole 54 in the major flat 2, and an annular part 56 surrounding the cut hole 58 in the lug 57 and overlaid closely on the second base part 56. The second extra thickness 55 also has a thickness twice as much as the major flat 2, and serves the same functions as the second extra thickness 15 in the first embodiment stated earlier.

Having described earlier specific embodiments of the monolayer metal gasket according to the present invention, it is believed obvious that the invention is not limited thereto but modifications and variations of the present invention is possible in light of the above teachings. For instance, the second extra thickness is not limited in construction and forming operation to those illustrative earlier: turning the major flat 2 itself back around the bolt hole 4, folding the protruding lug 47, 57 integral with the major flat 2 back on the major flat 2, or securing any additional layer such as washer and others on the major flat 2. Whether the folded constructions or the closely layered constructions around the gas hole 3 and the bolt hole 4, they may be made changed circumferentially in radial width. Moreover, the monolayer metal gasket may be enhanced in sealing effect, whether locally or overall, by employing the secondary seal of the soft sealing member like the soft sealing member 20 in FIG. 2 around the gas hole, which is made of a soft sealing material such as rubber, graphite, and so on. Any metallic thin sheet such as, for example, the shim 7 disposed between the adjacent gas holes 3, 3 may be applied partially to improve or reinforce the sealing effect in the monolayer metal gasket.

Metallic materials used for the monolayer metal gasket are steel, stainless steel, aluminum, aluminum alloys, titanium-aluminum alloys, and so on. Preferable steel is Mn—Ni—N non-magnetic stainless steel, which is higher in strength and heat resistance than SUS304 and also hard to form martensite even when subjected to cold worked. The thickness of the metallic sheet is on the order of ranging from 0.2 mm to 0.8 mm (0.5 mm±α) Moreover, the monolayer metal gasket may be applied on any surface thereof with a coating for micro-sealing, like the illustrative coatings 14, 18 for micro-sealing. As an alternative, a soft sealing member like the illustrative soft sealing member 20 may be available, instead of the coating for micro-sealing.

Besides, while the monolayer metal gasket of the present invention has been particularly shown and described with reference to the head-to-block gasket used to seal the joint between the mating surfaces of the cylinder head 25 and the cylinder block 25, it will be obvious to those skilled in the art that the present invention may be applied with equal utility to any head-to-manifold gasket used installed between the cylinder head and the intake and/or exhaust manifolds. Moreover, there is no limitation as to whether the folded constructions and the closely layered constructions at the first extra thickness and second extra thickness confront any of the cylinder head 25 and the cylinder block 26.

What is claimed is:

1. A monolayer metal gasket comprising:

a single metallic sheet made with a gas hole and a bolt hole through which a fastening bolt is adapted to pass, a first extra thickness formed around the gas hole and made larger in thickness than the metallic sheet, and a second extra thickness formed around the bolt hole and made larger in thickness than the metallic sheet;

wherein the first extra thickness is provided by turning back a part of the metallic sheet on a major surface of the metallic sheet while leaving a space open between them, wherein the second extra thickness includes an overlaid part provided by folding back a part of the metallic sheet on the major surface of the metallic sheet to make a closely layered construction;

wherein the first extra thickness is composed of a first base part extending around the gas hole integrally from a major flat of the metallic sheet, and a first folded part integral with the first base part and turned back on the first base part to form the space between them;

wherein the first base part and folded part making up of the first extra thickness throughout around the gas hole bulge out above opposite major surfaces of the metallic sheet in opposite directions to each other, the first base part and folded part of the first extra thickness are applied on their outside surfaces thereof with coatings of micro-sealing, one to each part, which lie throughout around the gas hole, moreover, a first bent area is made radially outwardly of the first extra thickness to make sure of smooth transition from the major flat to the first base part of the metallic sheet, and a soft sealing member is arranged radially outwardly of the first bent area on any one side of the major flat of the metallic sheet;

wherein the second extra thickness is composed of a second base part extending around the bolt hole integrally from the major flat of the metallic sheet, and a part overlaid on the second base part into the closely layered construction, wherein the second extra thickness has a thickness twice as much as the major flat of the metallic sheet; wherein the second base part and the overlaid part of the second extra thickness throughout around the bolt hole are applied on their outside surfaces thereof with coatings of micro-sealing, one to each part, which lie throughout around the bolt hole, and a second bent area is made radially outwardly of the second extra thickness to make sure of smooth transition from the major flat to the second base part of the metallic sheet;

wherein the metallic sheet is overlaid with a shim plate at an area between any adjacent gas holes and the length of the shim plate is less than the diameter of the gas hole;

wherein the shim plate is disposed in a way not embraced inside the first folded part, but spaced apart away from the first folded part; and wherein the major flat of the metallic sheet has a thickness ranging from 0.2mm to 0.8mm.

2. A monolayer metal gasket constructed as defined in claim 1, wherein the overlaid part is a second folded part extending integrally from the second base part and turned back around the bolt hole.

3. A monolayer metal gasket constructed as defined in claim 1, wherein the overlaid part is formed with a bolt hole in line with the bolt hole in the single metallic sheet, and includes the part overlaid around the bolt hole in the single metallic sheet.

4. A monolayer metal gasket constructed as defined in claim 3, wherein the overlaid part is a washer.

5. A monolayer metal gasket constructed as defined in claim 1, wherein the overlaid part is made of a lug protruding integrally out from the major flat of the metallic sheet and made therein with a cut hole having an annular part, the lug being turned back in such a way to align the cut hole with the bolt hole whereby the annular part surrounds the bolt hole.

* * * * *